(12) United States Patent
Segall et al.

(10) Patent No.: US 8,204,325 B2
(45) Date of Patent: Jun. 19, 2012

(54) SYSTEMS AND METHODS FOR TEXTURE SYNTHESIS FOR VIDEO CODING WITH SIDE INFORMATION

(75) Inventors: Christopher A. Segall, Camas, WA (US); Yeping Su, Camas, WA (US); Byung Tae Oh, Los Angeles, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 879 days.

(21) Appl. No.: 12/203,848

(22) Filed: Sep. 3, 2008

(65) Prior Publication Data

US 2009/0185747 A1 Jul. 23, 2009

Related U.S. Application Data

(60) Provisional application No. 61/022,160, filed on Jan. 18, 2008.

(51) Int. Cl.
| | |
|---|---|
| *G06K 9/36* | (2006.01) |
| *G06K 9/46* | (2006.01) |
| *H04B 1/66* | (2006.01) |
| *H04N 11/02* | (2006.01) |

(52) U.S. Cl. ...................................... 382/243
(58) Field of Classification Search .................. None
See application file for complete search history.

(56) References Cited

U.S. PATENT DOCUMENTS

| | | | | |
|---|---|---|---|---|
| 5,533,140 | A * | 7/1996 | Sirat et al. ................. | 382/108 |
| 5,974,186 | A | 10/1999 | Smith et al. | |
| 7,184,602 | B2 * | 2/2007 | Cohen et al. ................ | 382/243 |
| 7,606,435 | B1 * | 10/2009 | Dumitras et al. ........... | 382/243 |

| | | | |
|---|---|---|---|
| 2006/0039617 | A1 | 2/2006 | Makai et al. |
| 2008/0205518 | A1 | 8/2008 | Wilinski et al. |
| 2009/0180552 | A1 * | 7/2009 | Visharam et al. ........ 375/240.26 |

FOREIGN PATENT DOCUMENTS

| | | |
|---|---|---|
| CN | 101223787 | 7/2008 |
| EP | 1599835 A1 | 11/2005 |
| EP | 1599835 B1 | 11/2005 |
| EP | 1635578 A2 | 3/2006 |
| EP | 1635578 A3 | 3/2006 |
| KR | 10-2008-0040710 | 5/2008 |
| WO | 9716027 A2 | 5/1997 |
| WO | 2004077360 A1 | 9/2004 |
| WO | 2007/010446 | 1/2007 |

OTHER PUBLICATIONS

A. Dumitras et al. "An Encoder-Decoder Texture Replacement Method With Application to Content-Based Movie Coding", IEEE Trans. on Circuits and Systems, Jun. 2004.*

Alexei Efros, Thomas Leung, "Texture Synthesis by Non-parametric Sampling" International Conference on Computer Vision (1999).*

(Continued)

*Primary Examiner* — Li Liu

(74) *Attorney, Agent, or Firm* — Austin Rapp & Hardman

(57) ABSTRACT

A method for texture synthesis for video coding with side information may be implemented by a decoder device. The method may include receiving seed texture at high fidelity. The method may also include receiving remaining portions of synthesized regions at low fidelity. The method may also include receiving marking of regions to synthesize. The method may further include synthesizing the marked regions based on the high-fidelity seed texture and the low-fidelity portions of the synthesized regions.

26 Claims, 10 Drawing Sheets

OTHER PUBLICATIONS

J. Portilla, E.P. Simoncelli, "A Parametric Texture Model Based on Joint Statistics of Complex Wavelet Coefficients," International Journal of Computer Vision, vol. 40, 2000, pp. 49-71.

R. Paget, I.D. Longstaff, "Texture Synthesis via a Noncausal Nonparametric Multiscale Markov Random Field," IEEE Transactions on Image Processing, vol. 7, No. 6, Jun. 1998, pp. 925-931.

A.A. Efros, W.T. Freeman, "Image Quilting for Texture Synthesis and Transfer," International Conference on Computer Graphics and Interactive Techniques, 2001.

L. Liang, C. Liu, Y. Xu, B. Guo, H. Shum, "Real-time Texture Synthesis by Patch-Based Sampling," ACM Transactions on Graphics, vol. 20, No. 3, Jul. 2001, pp. 127-150.

V. Kwatra, A. Schodl, I. Essa, G. Turk, S. Bobick, "Graphcut Textures: Image and Video Synthesis using Graph Cuts," ACM SIGGRAPH, pp. 277-286, 2005.

V. Kwatra, I. Essa, A. Bobick, N. Kwatra, "Texture Optimization for Example-Based Synthesis," ACM SIGGRAPH, vol. 24, No. 3, pp. 795-802, 2005.

P. Ndjiki-Nya, B. Makai, G. Blattermann, A. Smolic, H. Schwarz, "Improved H.264/AVC Coding Using Texture Analysis and Synthesis," Proc. ICIP 2003, vol. 3, pp. 849-852, Barcelona, Spain, Sep. 2003.

P. Ndjiki-Nya, C. Stuber, T. Wiegand, "A New Generic Texture Synthesis Approach for Enhanced H.264/MPEG4-AVC Video Coding," International Workshop on Very Low Bitrate Video (VLBV'05), Sardinia, Italy, Sep. 2005.

P. Ndjiki-Nya, C. Stuber, T. Wiegand, "Texture Synthesis Method for Generic Video Sequences," Proc. ICIP 2007.

A. Ortega, K. Ramchandran, "Rate-Distortion Methods for Image and Video Compression," IEEE Signal Processing Magazine, pp. 23-50, 1998.

\* cited by examiner

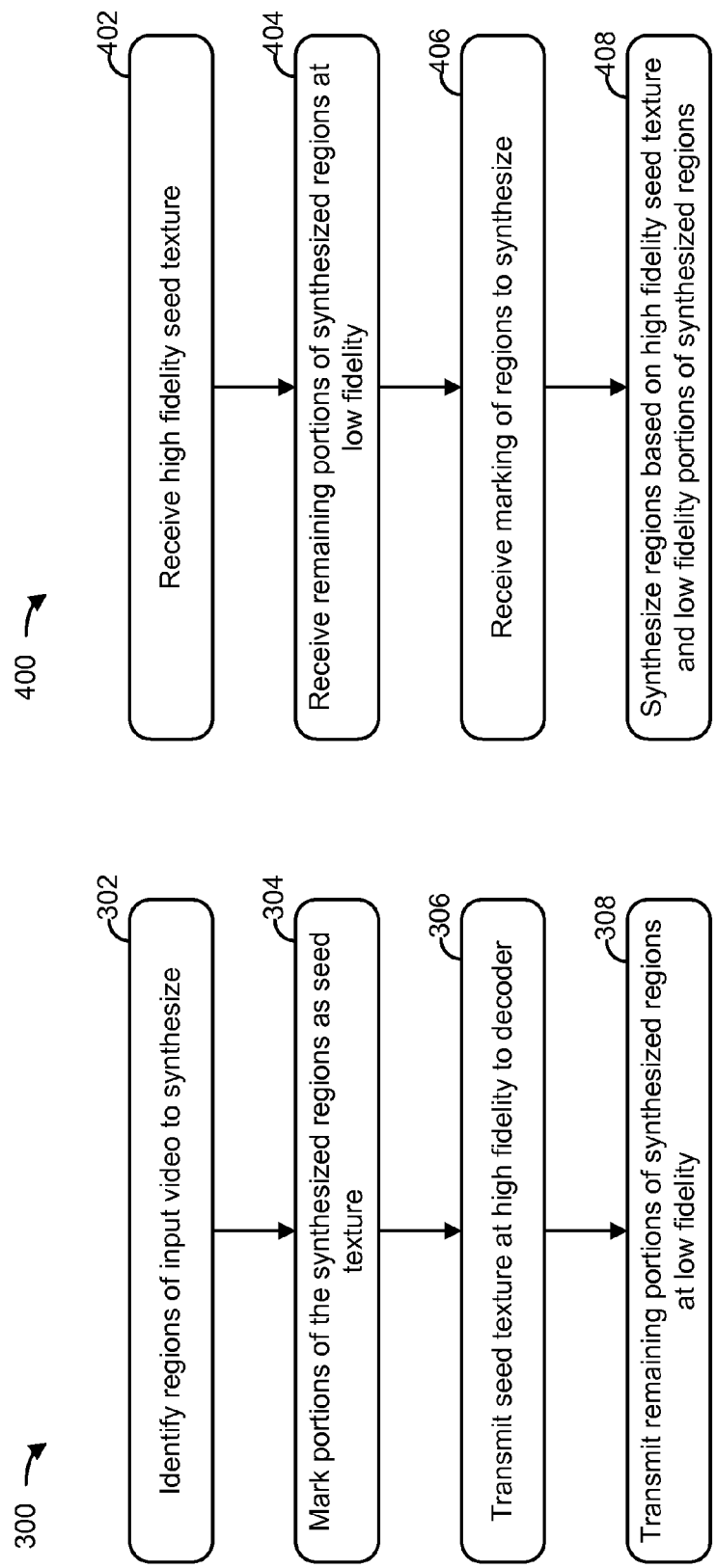

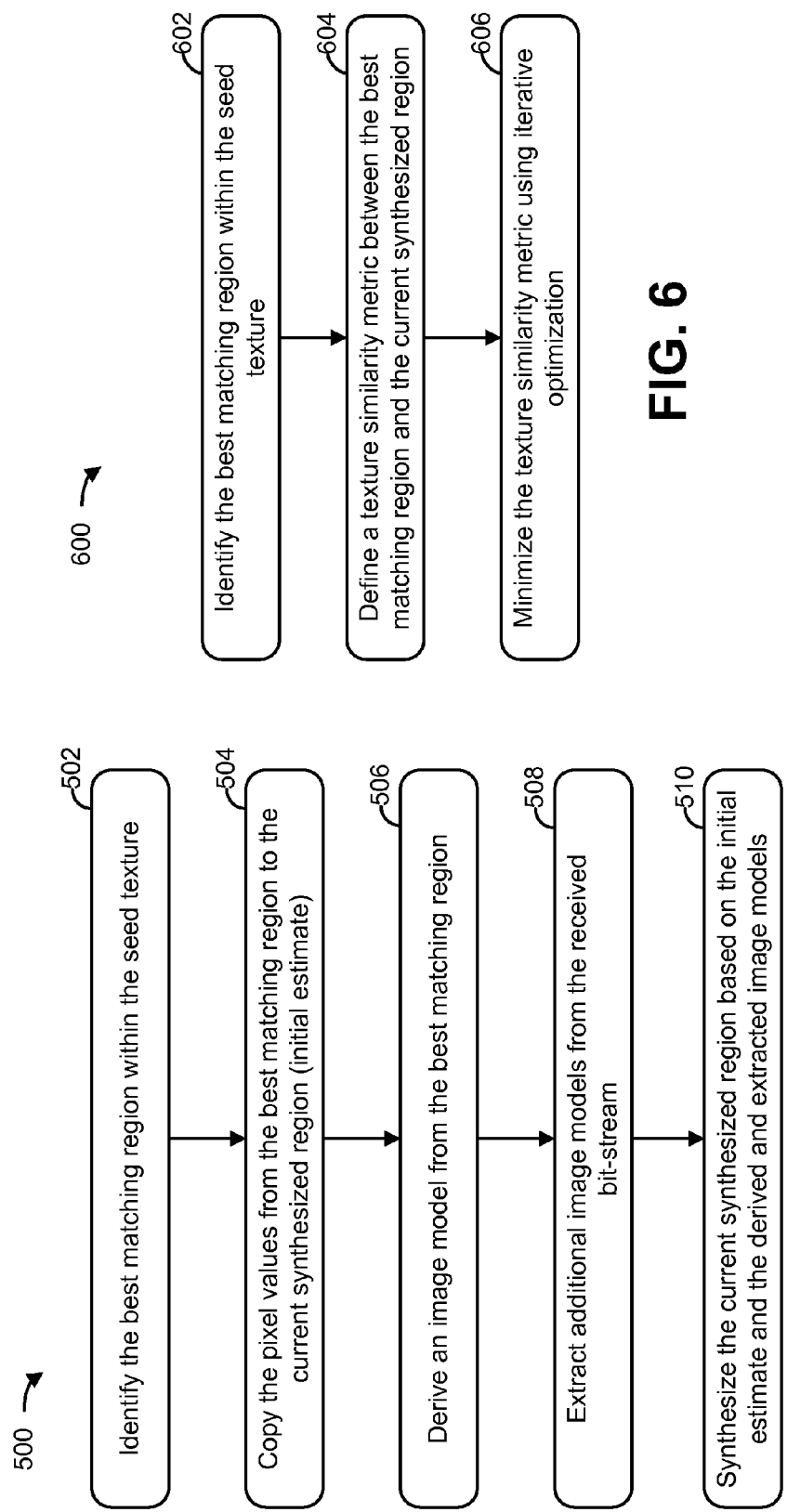

SYSTEMS AND METHODS FOR TEXTURE SYNTHESIS FOR VIDEO CODING WITH SIDE INFORMATION

RELATED APPLICATIONS

This application is related to and claims priority from U.S. patent application Ser. No. 61/022,160, filed Jan. 18, 2008, for "Systems and Methods for Texture Synthesis for Video Coding With Side Information," with inventors Christopher A. Segall, Yeping Su, and Byung Tae Oh, which is incorporated herein by reference.

TECHNICAL FIELD

The present disclosure relates generally to video processing. More specifically, the present disclosure relates to systems and methods for texture synthesis for video coding with side information.

BACKGROUND

The present disclosure relates generally to texture within video, i.e., visual texture. As used herein, the term "texture" may refer to a digital image or a sequence of digital images that comprises repeated elements. These repeated elements may create the illusion of a three-dimensional textured surface, i.e., the appearance of a textured surface to the eye.

More specifically, the present disclosure relates to the problem of texture synthesis for video coding. The fundamental goal of texture synthesis is to synthesize an image sequence that is perceptually identical (or similar) to an original image sequence. However, the pixel values of the synthesized sequence are allowed to be significantly different than the pixel values in the original sequence. This differs from a traditional coding approach, where we seek to approximate the original pixel values as closely as possible.

Texture synthesis is best motivated for image sequences that are somewhat random. For example, the movement of water, grass and trees are good candidates for texture synthesis.

Texture synthesis is used in many fields, including digital image editing, three-dimensional computer graphics, post-production of films, etc. Texture synthesis can be used to fill in holes in images, create large non-repetitive background images, expand small pictures, and so forth.

BRIEF DESCRIPTION OF THE DRAWINGS

FIG. 3 illustrates an example of a method that may be implemented by an encoder device in accordance with the present disclosure;

FIG. 4 illustrates an example of a method that may be implemented by a decoder device in accordance with the present disclosure;

FIG. 5 illustrates one possible implementation of the step of synthesizing regions of texture data from the method of FIG. 4;

FIG. 6 illustrates another possible implementation of the step of synthesizing regions of texture data from the method of FIG. 4;

DETAILED DESCRIPTION

Figure 1:
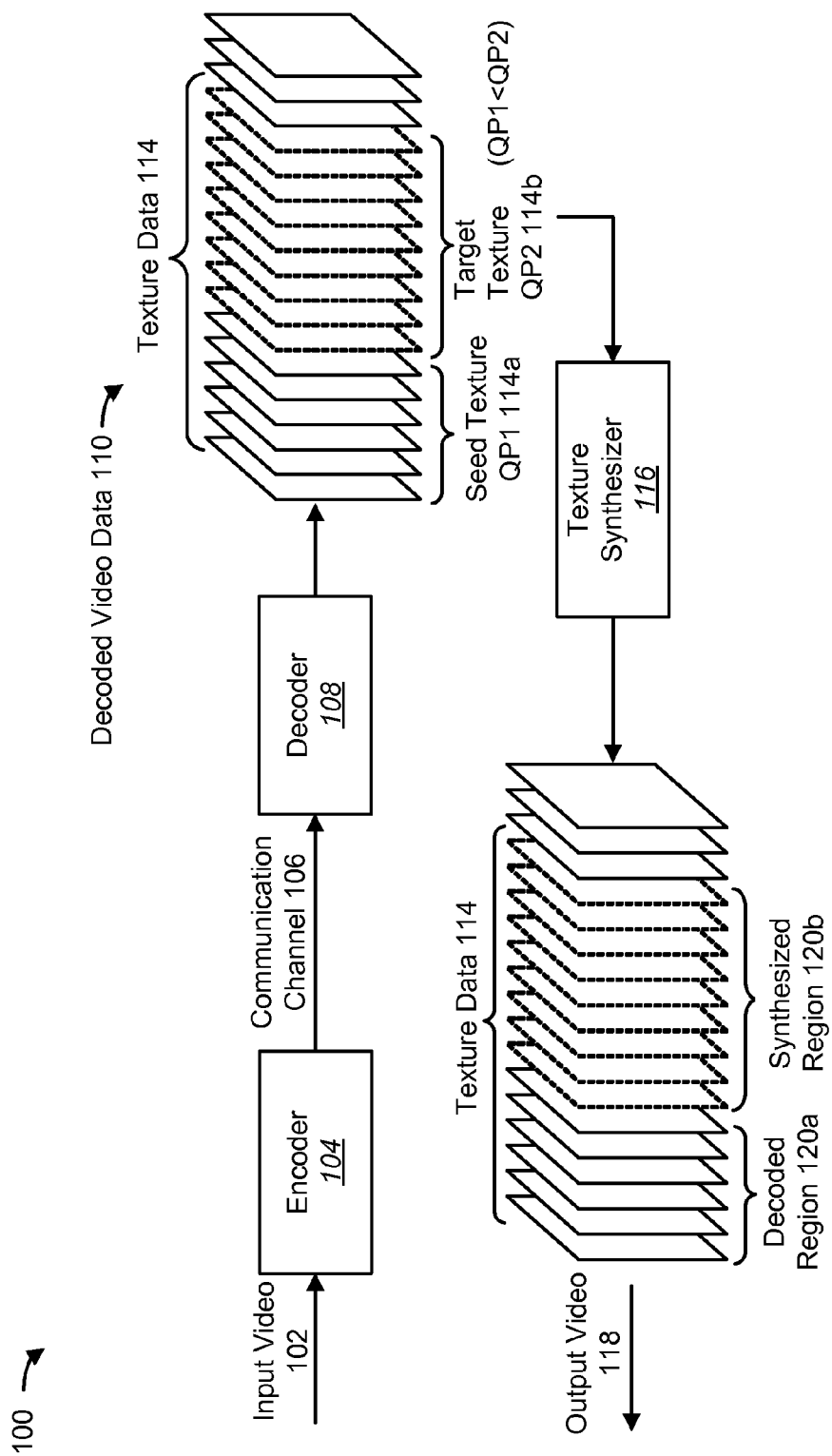
FIG. 1 illustrates an example of a system that is configured to perform texture synthesis for video coding.

A method for texture synthesis for video coding with side information is disclosed. The method may be implemented by a decoder device. The method may include receiving seed texture at high fidelity. The method may also include receiving remaining portions of synthesized regions at low fidelity. The method may also include receiving marking of regions to synthesize. The method may further include synthesizing the marked regions based on the high-fidelity seed texture and the low-fidelity portions of the synthesized regions.

Synthesizing the marked regions may include identifying at least one best-matching region within the seed texture. An initial estimate may be obtained. Obtaining the initial estimate may include copying pixel values from a best-matching region to a current synthesized region. An image model may be derived from the at least one best-matching region. Additional image models may be extracted from a received bitstream. The current synthesized region may be synthesized based on the initial estimate and the derived and extracted image models.

Multiple best-matching regions may be identified. In this case, a weighted combination of the multiple best-matching regions may be used for synthesizing the marked regions.

The transmitted image models may include at least one of a quantization parameter, a quantized level value and a prediction mode.

Synthesizing the current synthesized region may be performed by projecting iteratively to an image model that is extracted from the received bitstream, and to an image model that is extracted from the seed texture.

As one example, the image model that is extracted from the seed texture may be an auto-correlation. A projection operator for the act of iterative projection may be a linear mapping to a desired correlation model.

As another example, the image model that is extracted from the seed texture may be sparseness in a transform domain. A projection operator for the act of iterative projection may be thresholding to arrive at desired sparseness.

The method may also include performing patch blending and de-blocking in order to enforce boundary smoothing.

The image model that is derived and the different types of image models that are transmitted may include at least one of the following: a model that is based on spatio-temporal correlation, a model that is based on histograms of pixel intensity, a model that is based on histograms of transform coefficients, and a model that is based on correlations in a transform domain.

Synthesizing the marked regions may include identifying at least one best-matching region within the seed texture. A texture similarity metric may be defined that indicates differences between the at least one best-matching region and a current synthesized region. A side information metric may be defined that indicates differences between the side information and the current synthesized region. The side information metric may be determined by finding a closest point by projection in the transform domain. Synthesizing the marked regions may also include jointly minimizing a combination of the texture similarity metric and the side information metric.

Block-wise processing may be performed. The act of synthesizing a particular block may be performed with knowledge of a synthesized result for neighboring, causal blocks. Alternatively, the act of synthesizing a particular block may be performed with knowledge of a synthesized result for all neighboring blocks. As another alternative, the act of synthesizing the marked regions may include performing causal texture synthesis with respect to the marked regions and then subsequently processing the marked regions in a non-causal manner.

The method may also include reducing computational complexity by performing at least one of the following: non-overlapping to overlapping grid searching, reducing the searching space using a spatial and multi-resolution relationship and reducing computation complexity using a transform domain coefficient.

A decoder device that is configured for texture synthesis for video coding with side information is disclosed. The decoder device includes a processor and memory in electronic communication with the processor. Instructions may be stored in the memory. The instructions may be executable to receive seed texture at high fidelity. The instructions may also be executable to receive remaining portions of synthesized regions at low fidelity. The instructions may also be executable to receive marking of regions to synthesize. Further, the instructions may be executable to synthesize the marked regions based on the high-fidelity seed texture and the low-fidelity portions of the synthesized regions.

A computer-readable medium for texture synthesis for video coding with side information is disclosed. The computer-readable medium may include executable instructions for receiving seed texture at high fidelity. The computer-readable medium may also include executable instructions for receiving remaining portions of synthesized regions at low fidelity. The computer-readable medium may also include executable instructions for receiving marking of regions to synthesize. The computer-readable medium may also include executable instructions for synthesizing the marked regions based on the high-fidelity seed texture and the low-fidelity portions of the synthesized regions.

A method for facilitating texture synthesis for video coding with side information is disclosed. The method may be implemented by an encoder device. The method may include identifying regions of input video to synthesize. The method may also include marking portions of the synthesized regions as seed texture. The method may also include transmitting the seed texture at high fidelity to a decoder device. The method may also include transmitting remaining portions of the synthesized regions to the decoder device at low fidelity.

There are two major areas of work for texture synthesis. The first area of work involves parametric approaches. In these methods, an image sequence is modeled by a number of parameters. For example, a histogram provides one model. Similarly, the correlation of the pixel values provides another model. Given a sufficient number of models, it is then possible to recreate the "look and feel" of any texture by finding a collection of pixel intensity values that satisfy the parameterized constraints. It is possible to describe the constraints with a projection operator (hard constraint) or a weighted penalty norm. These are respectively equivalent to saying that the synthesized intensity values "must" satisfy a parameterized constraint or that the intensity values "should be close to" a parameterized model.

The second major area of work involves non-parametric approaches. Here, the synthesized texture is derived from an example texture that is known a priori. The texture synthesis process creates additional texture data by inspecting the example, or seed, texture and copying intensity values in the seed texture to the new texture region. Finding the intensity values to be copied is a differentiating factor here. However, a common method is to search the seed texture for an image region that best matches the pixel values neighboring the region to be synthesized. Then, the pixel values next to the best match are copied. Alternative approaches find multiple matches or utilize different definitions for the neighborhood.

Employing texture synthesis in a video coding application modifies the texture synthesis problem. The following differences are noted. First, video coding applications do not allow for the lossless transmission of seed texture or model information to the synthesizer. In addition, transmission of large amounts of seed texture or model information diminishes the value of the texture synthesizer (a video coding environment has the option of coding a texture explicitly). Moreover, the complexity of the synthesizing operation should be tractable. (For example, it should be within an order of magnitude of the complexity of other video decoding processes.) Also, unlike texture synthesis for graphical applications, the video coding system has knowledge of the original intensity values in the texture. Finally, the texture synthesis operation should interoperate with other coding tools, such as inter- and intra-frame prediction as well as residual coding. And the overall design enables adjustable combinations of pure synthesizing and conventional video coding.

Given the above differences, the present disclosure considers a texture synthesis system that leverages the technology of current, state-of-the-art video coding systems. (Examples include the International Telecommunication Union (ITU) and Moving Picture Experts Group (MPEG) family of standards.) In accordance with the present disclosure, the bitstream may be used to transmit side-information to a texture synthesizer. A component of this side information may be structured to directly correspond to a low-quality version of the image sequence. Then, the goal of the texture synthesizer may be to improve the rendering of texture within the low-quality version.

Reference is now made to FIG. 1. FIG. 1 illustrates an example of a system 100 that is configured to perform texture synthesis for video coding.

Input video 102 is provided to an encoder 104, which encodes the input video 102. The encoded video data is then transmitted across a communication channel 106 to a decoder 108. The decoder 108 decodes the received video data, thereby obtaining decoded video data 110.

The decoded video data 110 includes at least some texture data 112. A portion of the texture data is seed texture 114a, and the remaining portion of the texture data is target texture 114b. The seed texture 114a was encoded and transmitted at high quality, and therefore the seed texture 114a is decoded in the same manner as the non-texture data within the decoded video data 110. The target texture 114a is the part of the texture data 110 that is going to be synthesized at the decoder side.

The decoded video 110 is provided to a texture synthesizer 116. The texture synthesizer 116 synthesizes the target texture 114b. Therefore, the texture data 110 within the output video 118 includes both a decoded region 120a (corresponding to the seed texture) and a synthesized region 120b (corresponding to the target texture).

Figure 2:
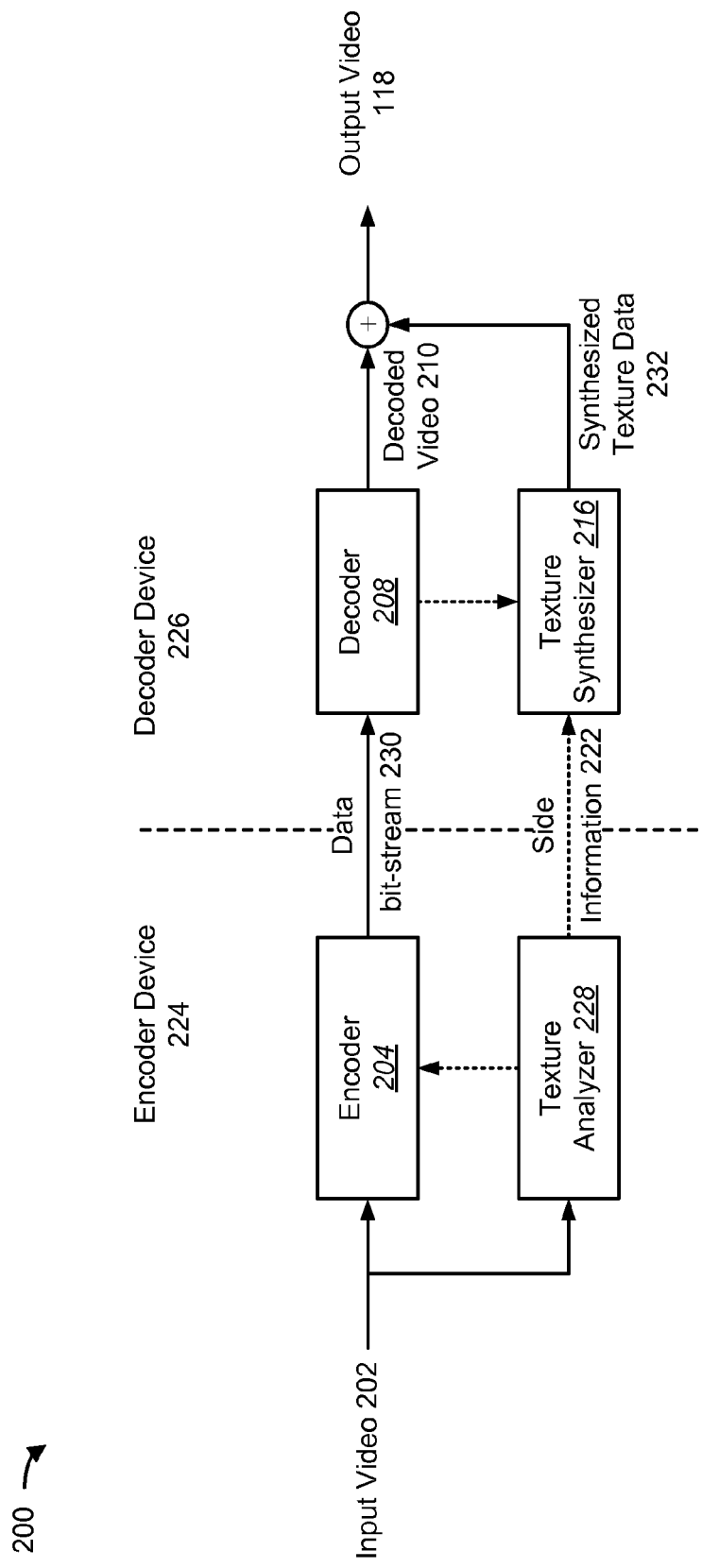
FIG. 2 illustrates an example of a system that is configured to perform texture synthesis for video coding using side information.

Reference is now made to FIG. 2. FIG. 2 illustrates an example of a system 200 that is configured to perform texture synthesis for video coding using side information 222.

The system 200 includes an encoder 204 and a decoder 208. The device on which the encoder resides will be referred to as an encoder device 224. Similarly, the device on which the decoder resides will be referred to as a decoder device 226.

Input video 202 is provided both to the encoder 204 and also to a texture analyzer 228. The encoder 204 encodes the input video 202, and the encoded video is transmitted as a data bitstream 230 to the decoder 208.

The texture analyzer 228 identifies texture data within the input video 202. Most of the texture data is not encoded; rather, only a small portion of the texture data (i.e., the seed texture) is encoded and transmitted, and the rest of the texture data 232 is synthesized by a texture synthesizer 216. The texture analyzer 228 examines the input video 202 to determine side information 222, which is transmitted to the texture synthesizer 216. The side information 222 facilitates the synthesis of the texture data 232. The side information 222 may include a low-quality version of the texture data that is to be synthesized.

The decoder 208 decodes the received data bitstream 230 and outputs decoded video 210. The texture synthesizer 216 produces the synthesized texture data 230. The decoded video 210 and the synthesized texture data 230 are added together to obtain the output video 218.

Reference is now made to FIG. 3. FIG. 3 illustrates an example of a method 300 that may be implemented by an encoder device in accordance with the present disclosure.

The method 300 may be performed with respect to input video that includes texture data. The method 300 may involve identifying 302 one or more regions of the input video to synthesize, i.e., identifying the regions of the input video that include the texture data. These regions will be referred to herein as synthesized regions.

One or more portions of the synthesized regions may be marked 304 as seed texture. The seed texture may be transmitted 306 to the decoder at high fidelity. The remaining portions of the synthesized regions may be transmitted 308 to the decoder at low fidelity.

Reference is now made to FIG. 4. FIG. 4 illustrates an example of a method 400 that may be implemented by a decoder device in accordance with the present disclosure.

The method 400 may involve receiving 402 the seed texture at high fidelity. The method 400 may also involve receiving 404 the remaining portions of the synthesized regions at low fidelity. The method 400 may also involve receiving 406 the marking of regions to be synthesized. These regions may then be synthesized 408 based on the high-fidelity seed texture that was received and also based on the low-fidelity portions of the synthesized regions that were received.

Reference is now made to FIG. 5. FIG. 5 illustrates one possible implementation of the step of synthesizing regions of texture data from the method of FIG. 4.

The method 500 shown in FIG. 5 illustrates the steps that may be performed with respect to a particular region of data (e.g., a block) that is to be synthesized. This region will be referred to as the current synthesized region. The steps that are shown in FIG. 5 may be repeated for each region of data that is to be synthesized. For example, texture synthesis may be performed on a block-by-block basis, and the illustrated steps may be performed for each block.

The method 500 may involve identifying 502 the region within the seed texture that best matches the low-fidelity version of the current synthesized region (i.e., the low-fidelity version of the region to be synthesized). The region that is identified within the seed texture will be referred to as the best matching region.

As one specific realization, the squared error between the extracted pixels and all possible locations within the seed data may be computed. The location with the minimum error may be identified as the best match. In a second specific realization, the squared error is computed. However, locations with a squared error smaller than a threshold are first identified. Then, the best match may be selected randomly from the identified locations.

The pixel values from the best matching region may be copied 504 to the current synthesized region. This provides an initial estimate of the pixel values for the current synthesized region.

An image model may be derived 506 from the best matching region. In the present disclosure, we consider the specific case of using spatio-temporal correlation as the model. However, other models are reasonable. For example, histograms of pixel intensity, histograms of transform coefficients, as well as correlations in a transform domain may be utilized.

The image modeling could also be based on multiple patches from the seed texture. Multiple patches can be obtained by keeping N-best candidates when searching seed textures, and using them may make it possible to explore variations of the patch appearances (conditioned on neighboring pixels). In the actual modeling, multiple patches could be used simply as extra samples in the estimation of the model; or alternatively the multiple patches could be an extra dimension of statistical modeling. In the later case, each model parameter $C_M(i)$ (extracted from the i-th patch) may be treated as one instance in the space of all possible image models. Subsequently the distribution of those instances in the model parameter space could be utilized to provide a more flexible statistical image model. One concrete example of exploring multiple patch information in the image modeling will be given later, using principle component analysis in the space of patch correlation.

The method 500 may also include extracting 508 image models from the transmitted bit-stream. For example, a quantization parameter, a quantized level value and, optionally, a prediction mode may be extracted 508 from the transmitted bit-stream. All information may be transmitted using the methods of state-of-the-art video coding systems (such as the ITU and MPEG family of standards). The received data may then be used to generate a reconstructed image frame, so that we have reconstructed pixel values in addition to the information in the bit-stream.

The current synthesized region may then be synthesized 510 based on the initial estimate and the derived and extracted image models. More specifically, the needed image region may be synthesized by finding a set of pixel values that is relatively "close" to the synthesized patch, but that also satisfies the derived and extracted image models. In this discussion, the image models are assumed to be binary constraints. That is, a synthesized result either satisfies the image model or it does not. (There is no partial membership.) This may be expressed as:

$$\hat{p} = \arg\min \|p-\bar{p}\|^2 \, s.t. \, Corr(p) = C_M, \, Q[T(p-b_R), q] = z \qquad (1)$$

where $\hat{p}$ is the synthesized result, $\bar{p}$ represents the intensity values selected as a result of the matching algorithm between seed texture and local neighborhood, Corr( ) is a function that computes the correlation of p, $C_M$ is the model for the correlation extracted from the seed texture, Q[ ] is the quantization operator, T is a transform matrix, $b_R$ is the reconstructed image frame, q is the quantization parameter, and z is the zero vector.

To find the synthesized result $\hat{p}$, we consider the iterative solution:

$$\hat{p}_{k+1} = P_T[P_C[\hat{p}_k + \alpha(\hat{p}_k - \bar{p})]] \qquad (2)$$

where $P_T$ and $P_C$ are, respectively, projection operators that enforce the side-information in the bit-stream and the image models derived from the seed data, $\alpha$ is a parameter that controls the convergence of the algorithm, and k is the iteration identifier. The process terminates when:

$$\|\hat{p}_{k+1} - \hat{p}_k\|^2 \leq T \qquad (3)$$

where T is a threshold near zero.

Projection Constraints for Transform Coefficients

The side information constraint, $P_T$, uses information in the bit-stream to restrict the synthesized texture. Here, we assume that an encoder transmits a low-quality version of the original image sequence to the decoder, and that the decoder uses this low-quality version during the synthesis operation. This low-quality version is expressed on a block-by-block basis as:

$$b_R = b_{Pred} + T^{-1}Q^{-1}[c,q] \qquad (4)$$

where $b_R$ denotes the reconstructed intensity values for a current block, $b_{Pred}$ denotes the predicted intensity values for a current block, $T^{-1}$ is the inverse transform operation, $Q^{-1}$ is an inverse quantization process, and c denotes the coefficients transmitted in the bit-stream for a current block. The term $Q^{-1}$ is not strictly an inverse of Q but rather denotes the process known as inverse quantization.

The goal is then to restrict the solution space for texture synthesis to only contain signals that would map to the same $b_R$. (Stated another way, the idea is that any valid texture when presented to the encoder should quantize/reconstruct to the same $b_R$ as expressed in the bit-stream.) The constraint may be expressed as:

$$P_T[x] = x - T^{-1}x_C \qquad (5)$$

where $$x_{C,i} = \begin{cases} \max\left(T(x-b_R)_i - \dfrac{q}{2}, 0\right) & T(x-b_R)_i > 0 \\ \min\left(T(x-b_R)_i + \dfrac{q}{2}, 0\right) & T(x-b_R)_i \leq 0 \end{cases} \qquad (6)$$

and $x_C$ is a correction vector, $x_{C,i}$ is the $i^{th}$ component of $x_C$ and $T(x-b_R)_i$ is the $i^{th}$ component of $T(x-b_R)$. It should be noted that $P_T[P_T[x]]$ is equal to $P_T[x]$.

Projection Constraints for Correlation Model

The signal model constraint, $P_C$, uses information from the seed texture to restrict the synthesized result. Here, we assume that the synthesizing algorithm determines a region in the seed texture that corresponds to the current block being synthesized. For the rest of this discussion, we assume that this location is determined by the triplet (x,y,t) that denotes the spatial and temporal position on the seed texture.

To apply the constraint, we begin by finding the relationship between neighboring pixels in the seed. This may be accomplished by solving the following equation:

$$m_C = (N^T N)^{-1} N^T o \qquad (7)$$

where o is the vector containing pixel values from the seed texture, N is a matrix containing the neighborhoods of the seed texture values and $m_C$ is the best (w.r.t. $I_2$) linear predictor for the observations given the neighborhoods. To illustrate the contents of o and N, consider the following scenario. Suppose that we want to estimate the linear predictor for an X by Y by Z size block in the seed texture given a neighborhood with size A by B by C. We may then construct the matrices with the following pseudo-code:

```
z=0
for( i=x; i<i+X; i++ )
    for (j=y; j<j+Y; j++ )
        for (k=t; k<t+Z; k++ )
        {
            o(z) = Seed(i,j,k)
            l=0;
            for( a=-A/2; a<A/2; a++ )
                for( b=-B/2; b<B/2; b++ )
                    for( c=0; c<C; c++ )
                    {
                        if( a && b && c )
                        {
                            N(l,z) = Seed(i+a,j+b,k-c);
                            l++;
                        }
                    }
            z++;
        }
```

We can then repeat the same procedure for the current synthesized result. That is, for $P_C[x]$, we can compute the neighborhoods for the locations in x. This is denoted as $N_x$ and we then have:

$$m_x = (N_x^T N_x)^{-1} N_x^T x \qquad (8)$$

where $m_x$ represents the best linear predictors for the current synthesized result.

We then update x so that it has the same linear predictor as the $m_C$ with the following process:

$$x = x + N_x(m_C - m_x) \qquad (9)$$

However, for most practical applications, the construction of the neighborhoods does not allow for the direct solution for the projection. This is due to the fact that the above equation updates all pixel values at once, and these updates are based on the values for x prior to the update. A potentially better solution is to use the iterative equation:

$$x_{k+1} = x_k + \beta N_{x,k}(m_C - m_{x,k}) \qquad (10)$$

where k represents the iteration.

The expression for the constraint is then:

$$P_C[x] = x_k + \beta N_{x,k}(m_C - m_{x,k}) \, s.t. \, m_C = m_{x,k+1} \qquad (11)$$

where $\beta$ is a scalar that controls convergence. It may be beneficial to update only a portion of x at each time step, k.

An alternative solution to satisfying the correlation model is to utilize a frequency domain method. Here, we compute the auto correlation matrix, C, for a block to be synthesized. We also assume a desired auto correlation model, $C_D$, that may be derived from information available to the decoder. We then solve for the matrix H, such that $HC = C_D$. Here, the matrix H describes the filter needed to map the block to be synthesized to the desired correlation model.

A filter f is then found that is described by the desired H. As one method for finding the filter, we represent H in the frequency domain. Then, we apply an absolute value and square root operation to the frequency domain values. Finally, we compute the inverse Fourier Transform to determine the values for the filter f. There may be multiple solutions for f that result in the same magnitude response. Other methods for selecting the values for f may be utilized in accordance with the present disclosure. No matter the method, the block to be synthesized is filtered by the filter values in f.

In some realizations of the algorithm, the auto-correlation of the block to be synthesized is recalculated after filtering. When the block does not satisfy the desired auto-correlation, the process described above is repeated. This process continues until the model is satisfied.

Sparseness Constraints

The statistical image model could also be based on a sparseness assumption. Loosely speaking, the sparseness assumption for texture images means only a small number of "texture primitives" are active. For the purpose of this work, we employ a linear, orthogonal transformation with local basis such as block DCT and wavelets. A sparse representation in the transform domain would then provide the constraints that about M out of N transform coefficients have small magnitudes. The index set I(i) then specifies which of the N coefficients are small. Or, we can further extend the sparseness constraints to be histogram invariant constraints, which incorporate the distribution of transform coefficient magnitudes.

The corresponding projection algorithm may look something like the following. First, a histogram H* may be learned from the seed patch(es) by applying thresholding in the transform domain. Then, a histogram of the current signal estimate $H(T(x_k))$ may be matched to H* using well-known histogram equalization techniques. This operation may be denoted as $H^*(T(x_k))$. Additional smoothing could be achieved by applying over-complete transforms such as shifted DCTs. Assuming $T_1 \sim T_p$ denotes a DCT transform with different shifts, we can combine $T_1^{-1}(H^*(T_1(x_k))) \sim T_p^{-1}(H^*(T_p(x_k)))$ using a simple average or a weighted average.

Of course, the sparseness constraints could be used as an additional model in the projection process aside from other models such as patch autocorrelation.

Boundary Considerations

Annoying boundary artifacts may result from a block-by-block based texture synthesizer. Such discontinuities could happen on two types of block boundaries, namely patch boundaries and transform block boundaries in enforcing side information constraints.

With respect to patch boundaries, here a patch is the unit for the seed texture search. Since in most cases a perfect match doesn't exist for the neighboring regions in searching the seed texture, a discontinuity may appear in the patched results.

With respect to transform block boundaries in enforcing side information constraints, since side information is specified on non-overlapping blocks, enforcing side information constraints for each block individually may inevitably cause blocky artifacts.

In order to remedy the first type of discontinuity, various methods to blend the overlapping patches have been proposed. In video coding design, de-blocking filters improve visual quality and prediction performance by smoothing the sharp edges which can form between blocks when block coding techniques are used. One problem with such existing approaches is that the end result is not guaranteed to satisfy either the side information constraints or the image model we assume. Thus, it may be desirable to build boundary smoothness constraints as an integral part of texture synthesizer design, so there will be no need for a post-processing step to smooth discontinuities.

One approach to deal with boundary artifacts is to add a boundary smoothing enforcing step in the sequence of projections: $P_S[P_C[P_T[x]]]$. Here the $P_S[\ ]$ step deals with both types of block boundaries by performing patch blending and de-blocking. Using repeated projections, the overall synthesizer aims to find solutions that satisfy all constraints involved, including the boundary smoothness.

A discussion of additional permutations and enhancements of the above algorithm will now be provided.

Projection Constraints for Clipping

The signal model constraint, $P_C$, uses information from the seed texture to restrict the synthesized result. Here, we introduce an additional model for the seed texture. Namely, the dynamic range of the texture is enforced. In one example, we first measure the maximum and minimum intensity values in the seed texture. Then, we constrain the synthesized result to not exceed this range. This is enforced by mapping any intensity values in the synthesized result to the minimum or maximum value, whichever is closer.

As a second example, we do not measure the maximum and minimum intensity values in the seed texture. Instead, we determine the bit-depth of the synthesized result. Intensity values that fall outside this range are clipped to reside in the allowable range. Specifically, if the synthesized result is an 8-bit image, values less than 0 or greater than 255 are not allowed. Any value greater than 255 is assigned the value 255 in this example. Similarly, any value less than 0 is assigned the value 0.

Extraction of Model Parameters

In previous discussions, we assumed that a unique location in the seed texture is identified as the best match. Then, models for the seed texture are extracted from this region. Here, we generalize the concept and consider that multiple locations in the seed texture are identified as good matches. Moreover, the "goodness" of the match may be expressed with a confidence metric.

In this more general scenario, the correlation model for the seed is extended as follows:

$$m_C = (N^T W^T W N)^{-1} N^T W^T W o \qquad (12)$$

where W is a diagonal matrix and element W(k,k) denotes the confidence at location k in the vector o.

Causality

Selection of the patch $\bar{p}$ for a given block requires information about the spatial and temporal neighborhood of the block. In this extension, we identify a patch $\bar{p}$ and subsequently refine the patch to generate $\hat{p}$. Then, we use the patch $\hat{p}$ when constructing the neighborhoods of subsequent blocks to find $\bar{p}$ for those blocks.

Unfortunately, the causal processing leads to compromises when enforcing the signal modeling constraint. Specifically, the model may describe relationships for both causal and non-causal pixels. (For example, a correlation constraint may require that pixel values be smooth, which should be enforced at both the causal and non-causal boundaries of the current block.) When this is true, it may be desirable to initially find values for $\hat{p}$ of each block using the causal method described in the previous paragraph. Following these calculations though, the values for $\hat{p}$ at all locations can be refined with a more global operations. In this global operation, we solve for all $\hat{p}$'s in the frame simultaneously. This is accomplished by using the iteration in equation (1) for all blocks in a simultaneous manner. That is, $\hat{p}_{k+1}$ is computed for each block location using the value for $\hat{p}_k$ at all blocks.

Signaling Signal Models

The signal models may not be derived explicitly from the seed texture. Instead, the signal models may be transmitted in the bit-stream. This transmission may be explicit, in that the needed model information is directly transmitted from encoder to decoder. Alternatively, the signaling may be a refinement of the model derived at the decoder. In this second case, the texture synthesis operation still inspects the seed texture and extracts model information. However, the model information is then refined by information transmitted in the bit-stream.

Non-Causal Processing

In most of the discussion above, the texture synthesis algorithm operates in a causal manner. This is due to the need for neighborhood information for selecting patches from the seed texture. As a generalization of the algorithm though, the methods described above can also be implemented without the causal restriction. That is, for each block in the image frame/sequence, a patch may be identified. Additionally, the signal model and side information may also be identified. The texture synthesis operation may then synthesize all blocks in the image frame/sequence simultaneously. Note that this may require an iterative process to address dependencies between image blocks and/or frames.

As a specific realization of non-causal processing, causal texture synthesis may be performed to allow for the identification of patches. Then, an image frame (or sequence) may be processed in a non-causal manner.

Reference is now made to FIG. 6. FIG. 6 illustrates another possible implementation of the step of synthesizing regions of texture data from the method of FIG. 4.

The method 600 shown in FIG. 6 illustrates the steps that may be performed with respect to a particular region of data that is to be synthesized, which will be referred to as the current synthesized region. The steps that are shown in FIG. 6 may be repeated for each region of data that is to be synthesized.

The method 600 may involve identifying 602 the region within the seed texture that best matches the low-fidelity version of the current synthesized region (i.e., the low-fidelity version of the region to be synthesized). The region that is identified within the seed texture will be referred to as the best matching region.

A texture similarity measure may be defined 604 between the best matching region and the current synthesized region. Then, the texture similarity energy may be minimized 606 using iterative optimization.

Figure 7:
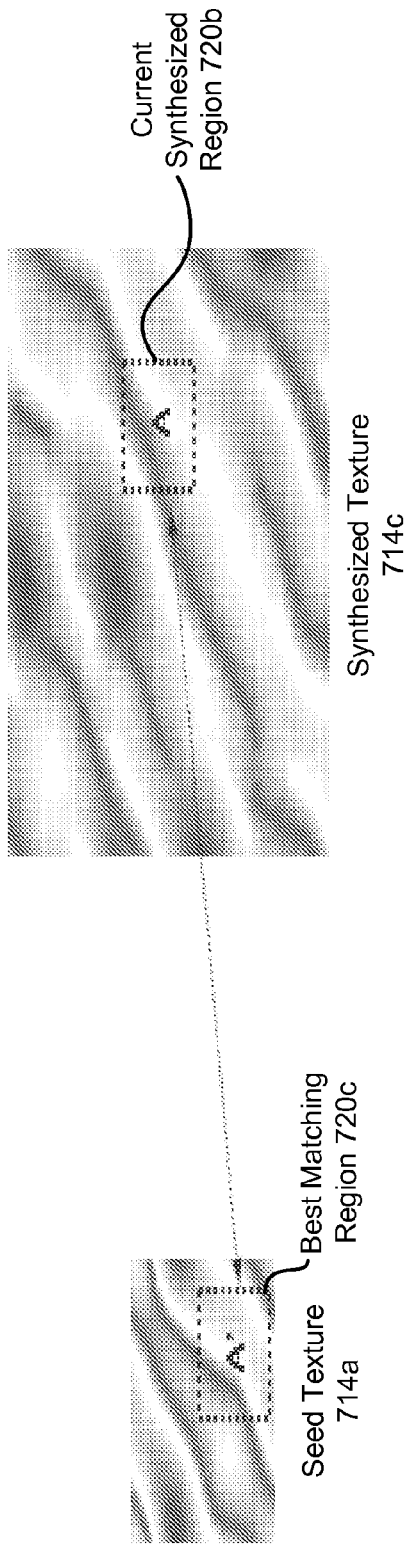
FIG. 7 illustrates an example of the best-matching region within seed texture.

In the method 600 of FIG. 6, the texture similarity may be defined as the distance between a given block of the synthesized image and its best-matching block in the seed texture (as shown in FIG. 7, to be discussed below). Then, the total texture energy may be obtained by summing all these block distortion values. These blocks may be extracted from the synthesized texture in an overlapping manner as shown in equation 12.

$$E_{syn} = \sum_p \|syn_p - seed_p\|^2 \quad (12)$$

where subscript p indicates an N×N block around the overlapping grid pixel p, i.e. neighborhood blocks of $syn_p$ have an overlapping area between them. For example, if the synthesized texture is the same as the seed texture, the texture energy will be zero. If we simply patch two seed textures, some blocks including the patch boundary will yield large distortion.

Finally, the optimized output will be the one with the smallest texture energy value as in equation 13. However, it is non-trivial to find an optimized solution which minimizes the texture energy. One approach is to use an EM-like iterative optimization method based on a multi-resolution approach, in which an initial estimate of the texture is iteratively defined to decrease the texture energy. In detail, the M-step minimizes the texture energy based on a fixed synthesized image by finding the best-matching image block from the seed, and the next E-step minimizes the texture energy based on a set of fixed seed blocks by solving the system equation of equation 13.

$$\operatorname*{argmin}_{syn} \sum_p \|syn_p - seed_p\|^2 \quad (13)$$

Furthermore, multi-resolution and multi-scale fashion texture synthesis methods may be utilized. The texture at the coarse-level images may be synthesized, and the current-stage output texture at the finer-level image may be refined with up-sampling. Such a multi-resolution approach may make it possible to preserve the global texture structure, and prevent the optimization process from easily falling into the local minimum. Similarly to the multi-resolution approach, it also provides multi-scale fashion synthesis, in which it varies the block size from large to small block. Such an approach is advantageous to keep the global structure and to synthesize the fine detail at the same time.

Reference is now made to FIG. 7. In FIG. 7, both synthesized texture 714c and seed texture 714a are shown. As discussed above, synthesizing texture data 732 may involve identifying the region 720c within the seed texture 714a that best matches the low-fidelity version of the current synthesized region 720b (i.e., the low-fidelity version of the region to be synthesized).

Video Texture Synthesis Based on Coarse-Scale Version Images

Based on the example-based approach discussed above, we extend the algorithm to the 3D video domain. In fact, it can be straightforwardly extended by defining the texture energy explained in equation 12 in terms of a 3D cube instead of a 2D image block. Furthermore, as mentioned above, additional information should be considered when synthesizing new texture. In other words, additional guide information should be included when searching the best-matching cube. (The terms "guide information" and "side information" are used interchangeably herein.) This is expressed in equation 14, where $c_p$ is a cube around the overlapping grid pixel p, $\|syn_p - seed_p\|^2$ is a texture similarity metric that indicates differences between a best-matching region and the current synthesized region, and function d indicates the side information metric that indicates differences between the synthesized and the coarse-scale image, which will be determined according to the type of coarse-scale image.

$$Syn = \operatorname*{argmin}_{syn} \sum_p [\|syn_p - seed_p\|^2 + \lambda \cdot d(syn_p, c_p)] \quad (14)$$

When we find the optimized output from the above equation 14, it is evident that the synthesized texture will be strongly dependent on the λ value and the amount of guide-information. For example, if we set λ=0, the overall framework will be the same as the synthesized new texture without any guide-information. On the other hand, a large λ value makes the guide-information critically affect the overall texture shape.

In order to determine the coarse-scale version of images, the proposed method uses a standard encoder/decoder, and uses a reconstructed image as coarse-scale guide information. As a different point of view, it might be interpreted that low-quality video (coarse-scale target video) is re-synthesized based on previously decoded high-quality video (seed video). The choice of a current standard coding algorithm for the coarse-scale data extraction is helpful in many ways. Above all, it makes it easier for the current algorithm to be embedded to the current standard without any major change of the system, and it does not need any additional module to produce the guide-information. Also, we can control the quality of the guide information easily by simply changing quantization parameter (QP) values.

Figure 8:
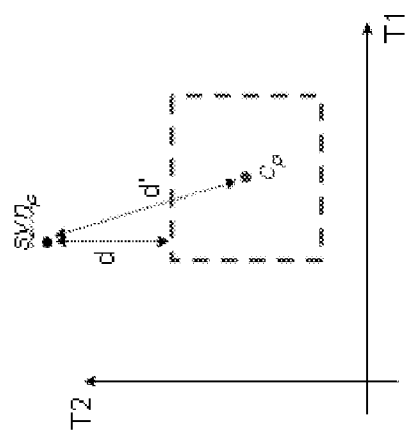
FIG. 8 illustrates an example of an approach for determining a side information metric.

Since the coarse-scale image is obtained by block transform and quantization by the current coding algorithm, the side information metric d should be carefully determined. For example, simple Euclidean distance may be not effective, especially when we use a large QP value. Instead, we find the closest point by projection in the transform domain, and assume it to be the distance between the projected point and the current point as shown in FIG. 8.

Area-Adaptive Amount of Guide Information

In the current framework, low-quality images can be considered to be guide information to control the general shape of the synthesized output texture. For this reason, the importance of guide information would be locally different. In other words, some parts of the texture could be well-synthesized without any guide-information, since its neighborhood texture also controls the current texture shape, but some regions could not. In this sense, the proposed algorithm utilizes different amounts of guide information for the different regions of texture.

Then, the problem is how to determine the amount of guide information, i.e. how much information should we assign for different regions at the encoder side, and the encoder sends area-adaptive guide information with its additional side-information to identify which region uses which QP value. Since the amount of guide information should be determined at the encoder side, it is worthwhile to note that both seed and target texture are known, so that we propose an iterative algorithm to determine the amount of guide information.

Figure 9:
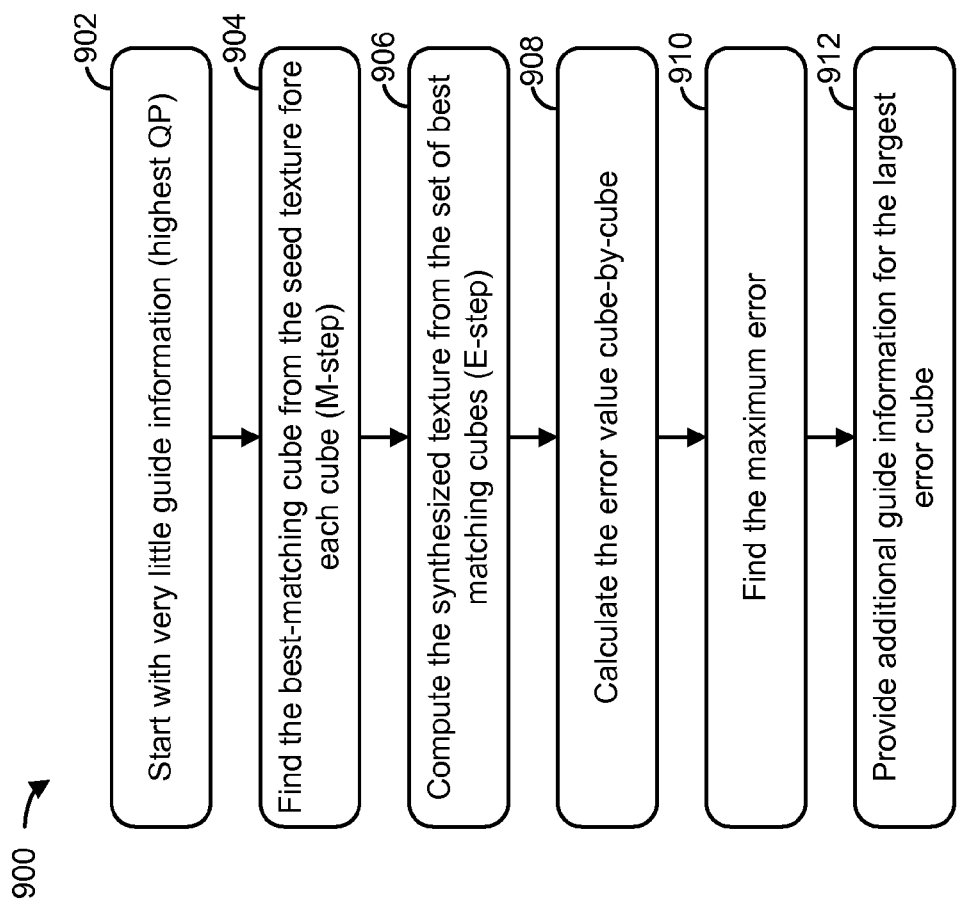
FIG. 9 illustrates an example of a method for determining the amount of guide information to be sent in accordance with the present disclosure.
Figure 10:
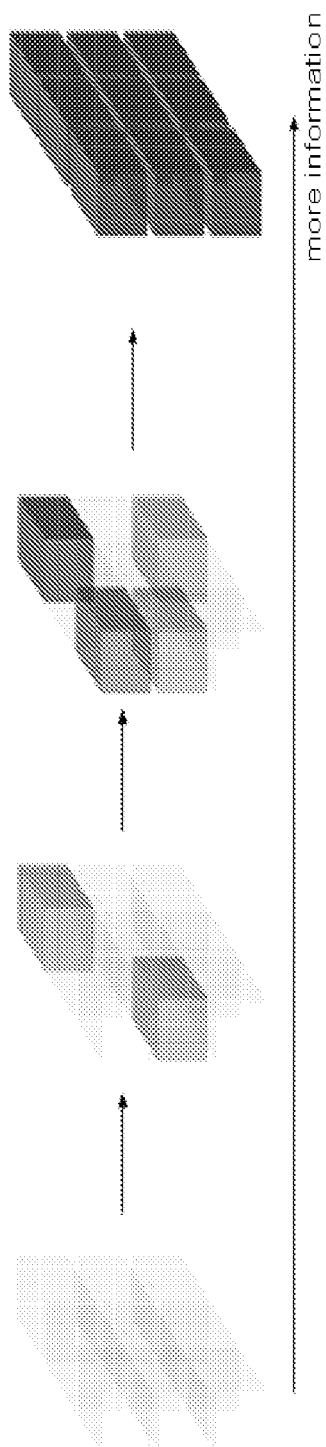
FIG. 10 illustrates a graphical representation of the method of FIG. 9.

FIG. 9 illustrates an example of a method 900 for determining the amount of guide information. In accordance with the depicted method 900, we start 902 with very little guide information (highest QP). Then, the best-matching cube from the seed texture is found 904 for each cube (M-step). The synthesized texture is computed 906 from the set of best-matching cubes (E-step). The error value is then calculated 908 cube-by-cube, and the maximum error is found 910. Then, additional guide information may be provided 912 for the largest error cube. Steps 904 through 912 may be repeated until a pre-determined bit budget is met or no further distinct improvement is achieved. The method 900 of FIG. 9 is illustrated graphically in FIG. 10.

Complexity Reduction of Searching Algorithm

To reduce computational complexity, we utilize distinct properties of the current framework as much as possible, which are (1) all seed (reference) images are fixed and available for all target images, (2) seed data are image (or video) so that it has strong spatial and temporal correlation between adjacent cubes, (3) the block transform of the target block is available by block-based encoding/decoding, and (4) the current framework is based on a multi-resolution approach. In order to maximize the above-mentioned properties, the complexity reduction methods are implemented with (1) non-overlapping to overlapping grid searching, (2) reducing the searching space using spatial and multi-resolution relationship, and (3) reducing computation using the transform domain coefficient. The details are described below.

Figure 11:
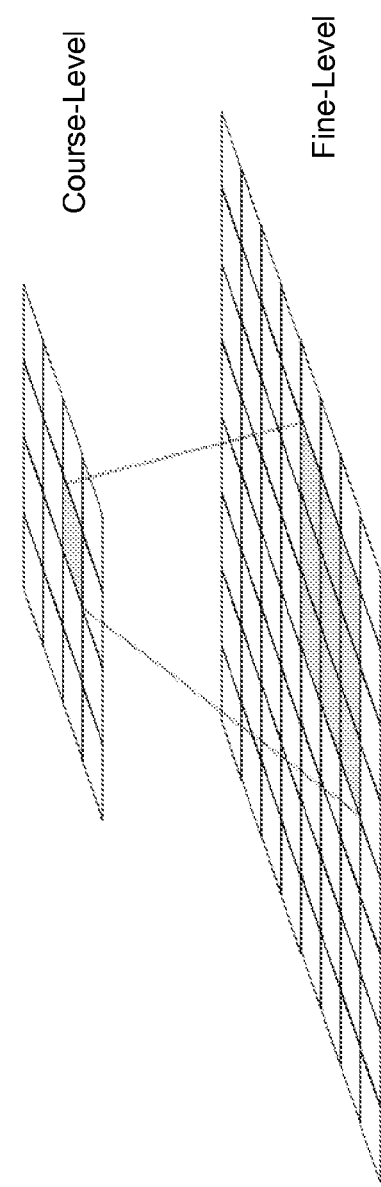
FIG. 11 illustrates an example of a multi-resolution approach for reducing the searching space.

First, since the current algorithm searches the best-matching cube in overlapping grid space, it requires more computation than only searching non-overlapping grid space. The idea is that if two adjacent cubes include the same part of the seed, its inner cube simply takes the same seed part without searching. Second, we basically use a multi-resolution approach, i.e. search the best-matching cube in coarse-resolution first, and refine it in fine-resolution later. Since the size of coarse-resolution space is much smaller than the size of finer resolution, a significant amount of computation can be saved. For example, when grid (i,j) is selected in coarse-resolution, then its 9 neighborhood values, i.e. (2i−1,2j−1) to (2i+1, 2j+1) are explored in the fine resolution as shown in FIG. 11.

Figure 12:
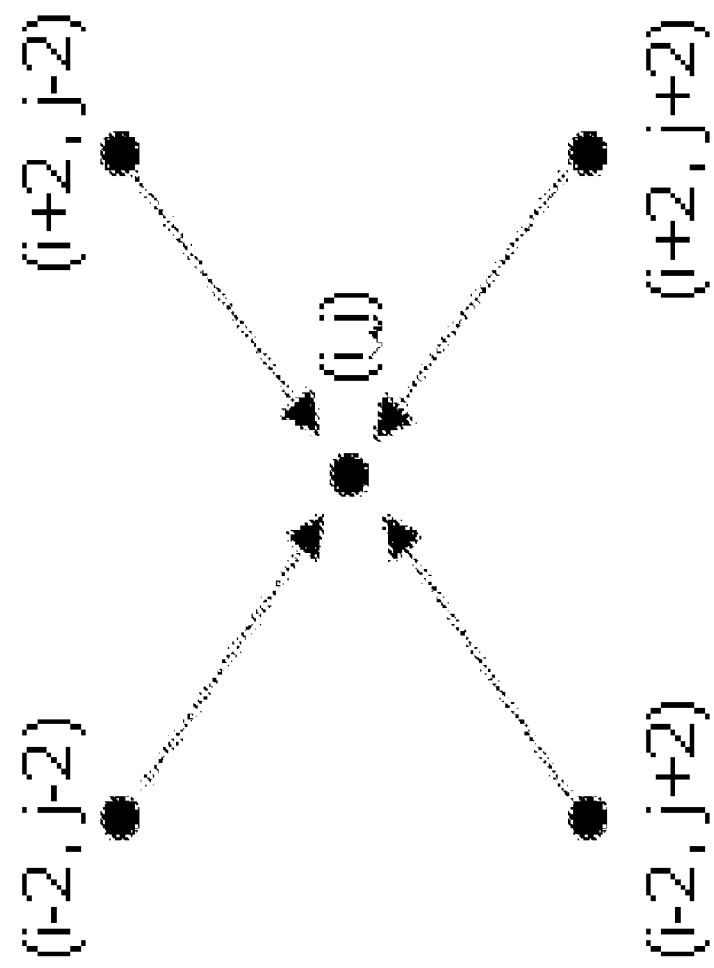
FIG. 12 illustrates an example of restricting the searching space based on a spatial relationship.

As a spatial relationship, we also restrict the searching space based on what we had found beforehand. For example, when we search the overlapping grid (i,j) as shown in FIG. 12, we restrict the seed space using its neighborhood (already found) set of best-matching index information.

Finally, we use the block transform domain when computing the texture distance. Then, we only take care of a few largest magnitude coefficients when computing the distance to reduce the complexity. It is similar to the general principle component analysis (PCA) approach with the assumption that the block transform permits us to extract a few principle components in the image. Such approximation by dimension reduction does not degrade the output quality much.

Figure 13:
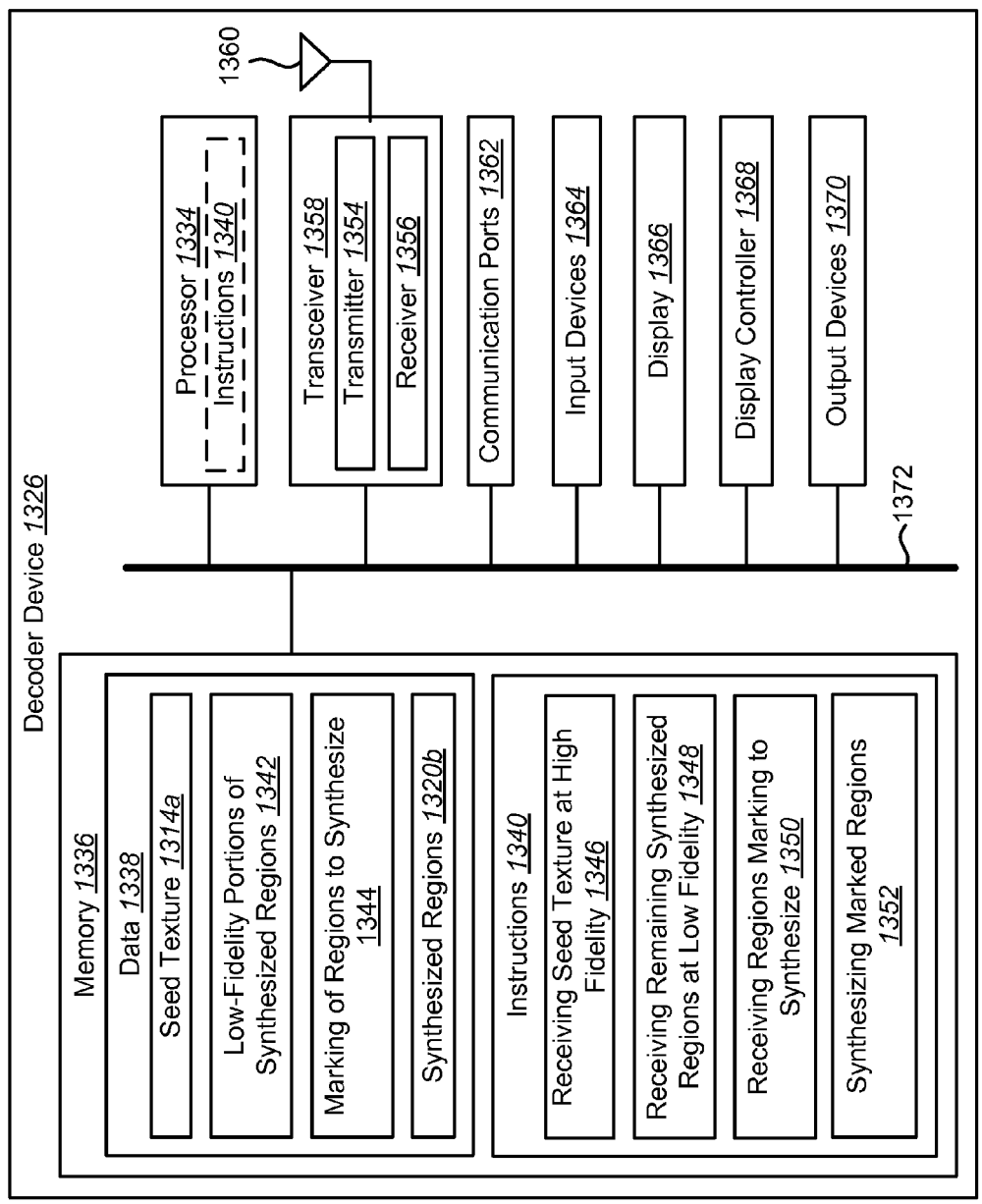
FIG. 13 illustrates an example of a decoder device that is configured for texture synthesis for video coding with side information.

Reference is now made to FIG. 13. FIG. 13 illustrates certain components that may be included within a decoder device 1326 that is configured for texture synthesis for video coding with side information in accordance with the present disclosure.

The decoder device 1326 includes a processor 1334. The processor 1334 may be a general purpose single- or multi-chip microprocessor (e.g., an ARM), a special purpose microprocessor (e.g., a digital signal processor (DSP)), a microcontroller, a programmable gate array, etc. The processor 1334 may be referred to as a central processing unit (CPU). Although just a single processor 1334 is shown in the decoder device 1326 of FIG. 13, in an alternative configuration, a combination of processors (e.g., an ARM and DSP) could be used.

The decoder device 1326 also includes memory 1336. The memory 1336 may be any electronic component capable of storing electronic information. The memory 1336 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1338 and instructions 1340 may be stored in the memory 1336. The instructions 1340 may be executable by the processor 1334 to implement various functions. Executing the instructions 1340 may involve the use of the data 1338 that is stored in the memory 1336.

Some examples of the data 1338 in the memory 1336 include: seed texture 1314a, low-fidelity portions of the synthesized regions 1342, marking 1344 of regions to synthesize, synthesized regions 1320b, etc. Other types of data 1338 that are relevant to implementing the techniques described herein may also be included in the memory 1336.

Some examples of the instructions 1340 in the memory 1336 include: instructions for receiving 1346 seed texture 1314a at high fidelity, instructions for receiving 1348 remaining portions of synthesized regions 1342 at low fidelity, instructions for receiving 1350 marking 1344 of regions to synthesize, and instructions for synthesizing 1352 the marked regions based on the high-fidelity seed texture 1314a and the low-fidelity portions of the synthesized regions 1342. Other instructions 1340 that are relevant to implementing the techniques described herein may also be included in the memory 1336.

The decoder device 1326 may also include a transmitter 1354 and a receiver 1356 to allow transmission and reception of signals between the decoder device 1326 and a remote location. The transmitter 1354 and receiver 1356 may be collectively referred to as a transceiver 1358. An antenna 1360 may be electrically coupled to the transceiver 1358. The decoder device 1326 may also include (not shown) multiple transmitters, multiple receivers, multiple transceivers and/or multiple antenna.

The decoder device 1326 may also include one or more communication ports 1362 for communicating with other devices. Communication with other devices may occur directly and/or via a computer network. Some examples of communication ports 1362 include Ethernet ports, Universal Serial Bus (USB) ports, parallel ports, serial ports, etc.

The decoder device 1326 may also include one or more input devices 1364. Examples of input devices 1364 include a keyboard, mouse, remote control device, microphone, button, joystick, trackball, touchpad, lightpen, etc.

The decoder device 1326 may also include a display 1366. A display controller 1368 may also be provided, for converting data 1338 stored in the memory 1336 into text, graphics, and/or moving images (as appropriate) shown on the display 1366.

The various components of the decoder device 1326 may be coupled together by one or more buses, which may include a power bus, a control signal bus, a status signal bus, a data bus, etc. For the sake of clarity, the various buses are illustrated in FIG. 13 as a bus system 1372.

Figure 14:
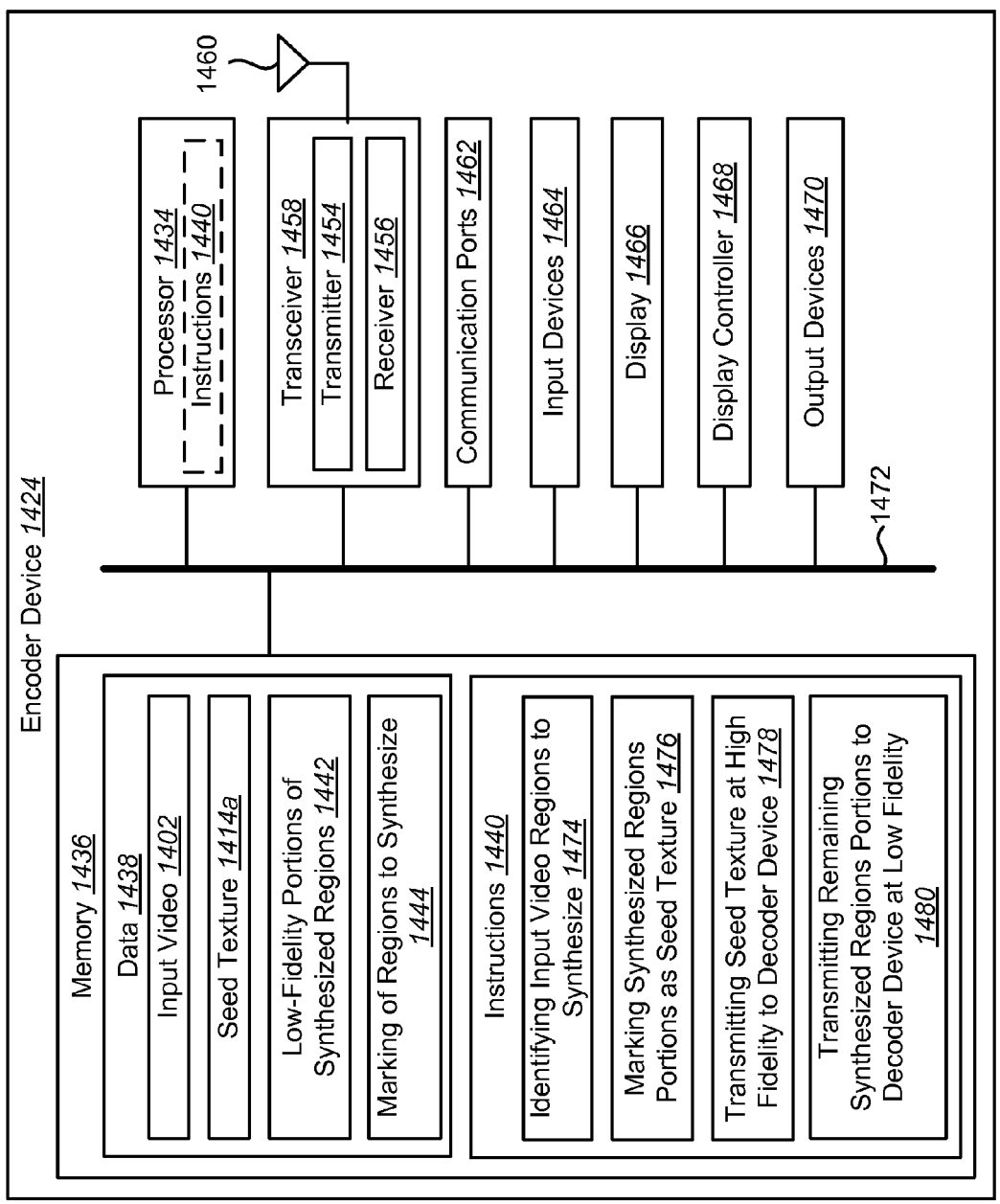
FIG. 14 illustrates an example of an encoder device that is configured to facilitate texture synthesis for video coding with side information.

Reference is now made to FIG. 14. FIG. 14 illustrates certain components that may be included within an encoder device 1424 that is configured for facilitating texture synthesis for video coding with side information in accordance with the present disclosure.

The encoder device 1424 includes similar components to those described above in connection with the decoder device 1326. In particular, the encoder device 1424 includes a processor 1434, memory 1436, data 1438 and instructions 1440 stored in the memory 1436, a transmitter 1454 and a receiver 1456 (which may be collectively referred to as a transceiver 1458), an antenna 1460, communication ports 1462, input devices 1464, a display 1466, a display controller 1468, output devices 1470, etc. The various components of the encoder device 1424 may be coupled together by a bus system 1472.

Some examples of the data 1438 in the memory 1436 include: input video 1402, seed texture 1414a, low-fidelity portions of synthesized regions 1442, marking 1444 of regions to synthesize, etc. Other types of data 1438 that are relevant to implementing the techniques described herein may also be included in the memory 1436.

Some examples of the instructions 1440 in the memory 1436 include: instructions for identifying 1474 regions of input video 1402 to synthesize, instructions for marking 1476 portions of the synthesized regions 1442 as seed texture 1414a, instructions for transmitting 1478 the seed texture 1414a at high fidelity to a decoder device, and instructions for transmitting 1480 remaining portions of the synthesized regions 1442 to the decoder device at low fidelity. Other instructions 1440 that are relevant to implementing the techniques described herein may also be included in the memory 1436.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "decoder device 1326" refers to the specific electronic device that is shown in FIG. 13. However, the use of "decoder device" without a reference number refers to any decoder device that is appropriate for the context in which the term is used, and is not limited to any particular decoder device shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for texture synthesis for video coding with side information, the method being implemented by a decoder device, the method comprising:
   receiving seed texture at high fidelity, wherein the seed texture is a portion of synthesized regions;
   receiving remaining portions of the synthesized regions at low fidelity;
   receiving marking of regions to synthesize; and
   synthesizing the marked regions based on the high-fidelity seed texture and the low-fidelity portions of the synthesized regions, wherein the low-fidelity portions comprise constraint information that constrains the synthesizing.

2. The method of claim 1, wherein synthesizing the marked regions comprises:
   identifying at least one best-matching region within the seed texture;
   obtaining an initial estimate;
   deriving an image model from the at least one best-matching region;
   extracting additional image models from a received bitstream; and
   synthesizing the current synthesized region based on the initial estimate and the derived and extracted image models.

3. The method of claim 2, wherein obtaining the initial estimate comprises copying pixel values from a best-matching region to a current synthesized region.

4. The method of claim 2, wherein multiple best-matching regions are identified, and further comprising using a weighted combination of the multiple best-matching regions for synthesizing the marked regions.

5. The method of claim 2, wherein the transmitted image models comprise at least one of a quantization parameter, a quantized level value and a prediction mode.

6. The method of claim 2, wherein synthesizing the current synthesized region is performed by projecting iteratively to:
   an image model that is extracted from the received bitstream; and
   an image model that is extracted from the seed texture.

7. The method of claim 6, wherein the image model that is extracted from the seed texture is an auto-correlation, and wherein a projection operator for the act of iterative projection is a linear mapping to a desired correlation model.

8. The method of claim 6, wherein the image model that is extracted from the seed texture is sparseness in a transform domain, and wherein a projection operator for the act of iterative projection is thresholding to arrive at desired sparseness.

9. The method of claim 2, further comprising performing patch blending and de-blocking in order to enforce boundary smoothing.

10. The method of claim 2, wherein the image model that is derived and the different types of image models that are transmitted comprise at least one of:
    a model that is based on spatio-temporal correlation;
    a model that is based on histograms of pixel intensity;
    a model that is based on histograms of transform coefficients; and
    a model that is based on correlations in a transform domain.

11. The method of claim 1, wherein synthesizing the marked regions comprises:
    identifying at least one best-matching region within the seed texture;
    defining a texture similarity metric that indicates differences between the at least one best-matching region and a current synthesized region;
    defining a side information metric that indicates differences between the side information and the current synthesized region; and
    jointly minimizing a combination of the texture similarity metric and the side information metric.

12. The method of claim 11, wherein the side information metric is determined by finding a closest point by projection in the transform domain.

13. The method of claim 11, wherein block-wise processing is performed, and wherein the act of synthesizing a particular block is performed with knowledge of a synthesized result for neighboring, causal blocks.

14. The method of claim 11, wherein block-wise processing is performed, and wherein the act of synthesizing a particular block is performed with knowledge of a synthesized result for all neighboring blocks.

15. The method of claim 11, wherein the act of synthesizing the marked regions comprises performing causal texture synthesis with respect to the marked regions and then subsequently processing the marked regions in a non-causal manner.

16. The method of claim 2, further comprising reducing computational complexity by performing at least one of:
   non-overlapping grid searching;
   reducing the searching space using a spatial and multi-resolution relationship; and
   using a reduced number of transform coefficients when computing distances.

17. A decoder device that is configured for texture synthesis for video coding with side information, comprising:
   a processor;
   memory in electronic communication with the processor;
   instructions stored in the memory, the instructions being executable to:
      receive seed texture at high fidelity, wherein the seed texture is a portion of synthesized regions;
      receive remaining portions of the synthesized regions at low fidelity;
      receive marking of regions to synthesize; and
      synthesize the marked regions based on the high-fidelity seed texture and the low-fidelity portions of the synthesized regions, wherein the low-fidelity portions comprise constraint information that constrains the synthesizing.

18. The decoder device of claim 17, wherein synthesizing the marked regions comprises:
   identifying at least one best-matching region within the seed texture;
   obtaining an initial estimate;
   deriving an image model from the at least one best-matching region;
   extracting additional image models from a received bitstream; and
   synthesizing the current synthesized region based on the initial estimate and the derived and extracted image models.

19. The decoder device of claim 18, wherein synthesizing the current synthesized region is performed by projecting iteratively to:
   an image model that is extracted from the received bitstream; and
   an image model that is extracted from the seed texture.

20. The decoder device of claim 17, wherein synthesizing the marked regions comprises:
   identifying at least one best-matching region within the seed texture;
   defining a texture similarity metric that indicates differences between the at least one best-matching region and a current synthesized region;
   defining a side information metric that indicates differences between the side information and the current synthesized region; and
   jointly minimizing a combination of the texture similarity metric and the side information metric.

21. A computer-readable medium for texture synthesis for video coding with side information, the computer-readable medium comprising executable instructions for:
   receiving seed texture at high fidelity, wherein the seed texture is a portion of synthesized regions;
   receiving remaining portions of the synthesized regions at low fidelity;
   receiving marking of regions to synthesize; and
   synthesizing the marked regions based on the high-fidelity seed texture and the low-fidelity portions of the synthesized regions, wherein the low-fidelity portions comprise constraint information that constrains the synthesizing.

22. The computer-readable medium of claim 21, wherein synthesizing the marked regions comprises:
   identifying at least one best-matching region within the seed texture;
   obtaining an initial estimate;
   deriving an image model from the at least one best-matching region;
   extracting additional image models from a received bitstream; and
   synthesizing the current synthesized region based on the initial estimate and the derived and extracted image models.

23. The computer-readable medium of claim 22, wherein synthesizing the current synthesized region is performed by projecting iteratively to:
   an image model that is extracted from the received bitstream; and
   an image model that is extracted from the seed texture.

24. The computer-readable medium of claim 21, wherein synthesizing the marked regions comprises:
   identifying at least one best-matching region within the seed texture;
   defining a texture similarity metric that indicates differences between the at least one best-matching region and a current synthesized region;
   defining a side information metric that indicates differences between the side information and the current synthesized region; and
   jointly minimizing a combination of the texture similarity metric and the side information metric.

25. A method for facilitating texture synthesis for video coding with side information, the method being implemented by an encoder device, the method comprising:
   identifying regions of input video to synthesize;
   marking portions of the synthesized regions as seed texture;
   transmitting the seed texture at high-fidelity to a decoder device; and
   transmitting remaining portions of the synthesized regions to the decoder device at low-fidelity, wherein the low-fidelity portions comprise constraint information for constraining the synthesis.

26. The method of claim 25, further comprising sending different amounts of the side information to the decoder device for different regions of texture.

* * * * *